United States Patent Office 3,634,511
Patented Jan. 11, 1972

3,634,511
1-(4-ACYLAMINO-2-ALKYLPHENOXY)-3-AMINO-
2-PROPANOL DERIVATIVES
Ralph Howe and Leslie Harold Smith, Macclesfield, England, assignors to Imperial Chemical Industries Limited, London, England
No Drawing. Filed Aug. 21, 1968, Ser. No. 754,456
Claims priority, application Great Britain, Sept. 7, 1967, 40,961/67
Int. Cl. C07c 103/44, 103/58
U.S. Cl. 260—562 A    4 Claims

ABSTRACT OF THE DISCLOSURE

The disclosure relates to 1-(4-acylamino-2-alkylphenoxy)-3-amino-2-propanol derivatives, processes for their manufacture, pharmaceutical compositions containing them and a method of using them to produce cardiac β-adrenergic blockade in warm-blooded animals. Representative of the compounds disclosed is 1-(2-ethyl-4-propionamidophenoxy)-3-t-butylamino-2-propanol.

This invention relates to new alkanolamine derivatives which possess β-andrenergic blocking activity and which are therefore useful in the treatment or prophylaxis of heart diseases, for example angina pectoris and cardiac arrhythmias, and in the treatment of hypertension and phaeochromocytoma, in man.

According to the invention we provide new alkanolamine derivatives of the formula:

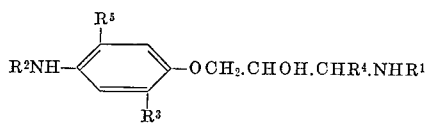

wherein $R^1$ stands for hydrogen or for an alkyl radical which may optionally be substituted by one or more substituents selected from hydroxy, alkoxy, aryl and aryloxy radicals, which aryl and aryloxy radicals may themselves optionally be further substituted by one or more halogen atoms or alkyl or alkoxy radicals, or wherein $R^1$ stands for a cycloalkyl or alkenyl radical, wherein $R^2$ stands for an acyl radical, wherein $R^3$ stands for an alkyl radical, and wherein $R^4$ and $R^5$, which may be the same or different, stand for hydrogen or for alkyl radicals, and the esters and aldehyde-condensation products and acid-addition salts thereof.

It is to be understood that the above definition of alkanolamine derivatives encompasses all possible stereoisomers thereof, and mixtures thereof.

As a suitable value for $R^1$ when it stands for an alkyl radical, optionally substituted, there may be mentioned, for example, an alkyl radical of up to 12 carbon atoms and particularly of 3, 4 or 5 carbon atoms, which preferably is branched at the α-carbon atom, for example, the isopropyl, s-butyl or t-butyl radical, which alkyl may optionally be substituted by one or two substituents selected from hydroxy radicals, alkoxy radicals of up to 5 carbon atoms, for example methoxy and propoxy radicals, and phenyl and phenoxy radicals which may themselves optionally be substituted by one or more chlorine or bromine atoms or methyl, ethyl, methoxy or ethoxy radicals. Thus, a specific value for $R^1$ when it stands for an alkyl radical, optionally substituted, is the isopropyl, s-butyl, t-butyl, 2-hydroxy-1,1-dimethylethyl or 1,1-dimethyl-2-phenylethyl radical.

As a suitable value for $R^1$ when it stands for a cycloalkyl radical there may be mentioned, for example, a cycloalkyl radical of up to 8 carbon atoms, for example the cyclopropyl, cyclobutyl of cyclopentyl radical.

As a suitable value for $R^1$ when it stands for an alkenyl radical there may be mentioned, for example, an alkenyl radical of up to 6 carbon atoms, for example the allyl radical.

As a suitable value for $R^2$ there may be mentioned, for example, an acyl radical derived from a carboxylic acid or from a sulphonic acid. Such a radical may be, for example, the formyl radical; an alkanoyl radical, for example an alkanoyl radical of up to 10 carbon atoms, for example the acetyl, propionyl, n-butyryl, isobutyryl, valeryl, pivaloyl, hexanoyl, heptanoyl or decanoyl radical; a halogenoalkanoyl radical, for example a halogenoalkanoyl radical of up to 6 carbon atoms, for example the chloroacetyl radical; a cycloalkanecarbonyl radical, for example the cyclopropanecarbonyl or cyclohexanecarbonyl radical; an alkenoyl radical, for example an alkenoyl radical of up to 6 carbon atoms, for example the acryloyl or crotonoyl radical; an aroyl radical, for example an aroyl radical of up to 10 carbon atoms, for example the benozyl radical, which may optionally be substituted by one or more halogen atoms or alkyl radicals of up to 4 carbon atoms, for example to form the p-methylbenzoyl, p-t-butylbenzoyl, o-chlorobenzoyl or p-chlorobenzoyl radical; an aralkanoyl or aralkenoyl radical, for example an aralkanoyl or aralkenoyl radical of up to 10 carbon atoms, for example the phenylacetyl or cinnamoyl radical; an aryloxyalkanoyl radical, for example an aryloxyalkanoyl radical of up to 10 carbon atoms, for example the phenoxyacetyl radical; an alkanesulphonyl radical, for eaxmple an alkanesulphonyl radical of up to 6 carbon atoms, for example the methanesulphonyl or ethanesulphonyl radical; or an alkoxycarbonyl radical, for example an alkoxycarbonyl radical of up to 6 carbon atoms, for example the ethoxycarbonyl radical.

As a suitable value for $R^3$ there may be mentioned for example, an alkyl radical of up to 10 carbon atoms, for example the methyl, ethyl, n-propyl, isopropyl, n-butyl, s-butyl, t-butyl, t-pentyl or 1-methylheptyl radical.

As a suitable value for $R^4$ or $R^5$ when it stands for an alkyl radical there may be mentioned, for example, an alkyl radical of up to 4 carbon atoms, for example the methyl radical.

As suitable esters of the alkanolamine derivatives of the invention there may be mentioned, for example, esters derived from an aliphatic carboxylic acid of up to 20 carbon atoms, for example acetic, palmitic, stearic or oleic acid, or esters derived from an aromatic carboxylic acid of up to 10 carbon atoms, for example benzoic acid, and the acid-addition salts thereof.

As suitable aldehyde condensation products of the alkanolamine derivatives of the invention there may be mentioned, for example, the 5-aryloxymethyl-3-alkyloxazolidine derivatives obtained by the condensation of an aldehyde of the formula $R^6.CHO$, wherein $R^6$ stands for hydrogen or for an alkyl radical, with the alkanolamine derivatives of the invention, an the acid-addition salts thereof.

As a suitable value for $R^6$ when it stands for an alkyl radical there may be mentioned, for example, an alkyl radical of up to 4 carbon atoms, for example the isopropyl radical.

As suitable acid-addition salts of the alkanolamine derivatives of the invention, or of the esters thereof, or of the aldehyde condensation products thereof, there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-napthoates, adipates or, 1,1- methylene-bis-(2-hydroxy - 3 - naphthoates), or salts derived from acidic synthetic resins, for example sulphonated polystyrene resins, for example "Zeo-Karb" 225 ("Zeo-Karb" is a trademark).

A particularly preferred group of alkanolamine derivatives of the invention comprises compounds of the formula

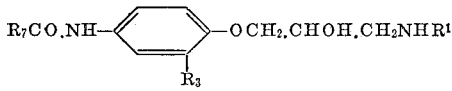

wherein $R^1$ stands for the isopropyl or t-butyl radical, wherein $R^3$ stands for an alkyl radical of up to 4 carbon atoms, and wherein $R^7$ stands for an alkyl radical of up to 4 carbon atoms, an alkenyl radical of 2 or 3 carbon atoms, the cyclopropyl, phenyl or styryl radical, or a tolyl or monochlorophenyl radical, and the acid-addition salts thereof.

Specific alkanolamine derivatives of the invention are, for example, these compounds hereinafter particularly described in Examples 1 to 20. Of these, particularly preferred compounds are those of the last formula given above wherein:

(a) $R^1$ stands for the isopropyl radical and either $R^3$ stands for the methyl radical and $R^7$ stands for the methyl, ethyl, t-butyl, phenyl or p-tolyl radical; or $R^3$ stands for the ethyl radical and $R^7$ stands for the methyl, ethyl, n-propyl, isopropyl, t-butyl, phenyl, p-tolyl, o-chlorophenyl or p-chlorophenyl radical; or $R^3$ stands for the n-propyl radical and $R^7$ stands for the methyl, ethyl or n-hexyl radical; or $R^3$ stands for the n-butyl or s-butyl radical and $R^7$ stands for the ethyl radical; or $R^3$ stands for the t-butyl radical and $R^7$ stands for the methyl radical; or (b) $R^1$ stands for the t-butyl radical and either $R^3$ stands for the methyl radical and $R^7$ stands for the ethyl, t-butyl or p-tolyl radical; or $^3$ stands for the ethyl radical and $R^7$ stands for the ethyl, n-propyl, isopropyl, n-butyl, t-butyl, vinyl, prop-1-enyl, phenyl, p-tolyl, o-chlorophenyl or styryl radical; or $R^3$ stands for the n-propyl radical and $R^7$ stands for the ethyl, n-propyl, chloromethyl or cyclopropyl radical; or $R^3$ stands for the isopropyl radical and $R^7$ stands for the ethyl or p-tolyl radical; or $R^3$ stands for the n-butyl, s-butyl, t-butyl or t-pentyl radical and $R^7$ stands for the ethyl radical; or (c) $R^3$ and $R^7$ both stand for the ethyl radical and $R^1$ stands for the hydrogen atom or for the s-butyl, 2-hydroxy-1,1-dimethylethyl or cyclopentyl radical; and the acid-addition salts thereof.

According to a further feature of the invention we provide a process for the manufacture of the alkanolamine derivatives of the invention which comprises the interaction of a compound of the formula:

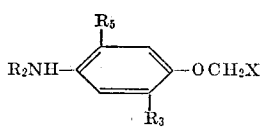

wherein $R^2$, $R^3$ and $R^5$ have the meanings stated above and wherein X stands for the group

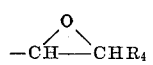

or the group —CHOH.CHR⁴Y, wherein $R^4$ has the meaning stated above and wherein Y stands for a halogen atom, or of mixtures of such compounds wherein X has both meanings stated above, with an amine of the formula $NH_2R^1$, wherein $R^1$ has the meaning stated above.

As a suitable value for Y there may be mentioned, for example, the chlorine or bromine atom. The interaction may be carried out at ambient temperature or it may be accelerated or completed by the application of heat, for example by heating to a temperature of up to 110° C.; it may be carried out at atmospheric or at elevated pressure, for example by heating in a sealed vessel; and it may be carried out in an inert diluent or solvent, for example methanol or ethanol, or an excess of the amine of the formula $NH_2R^1$, wherein $R^1$ has the meaning stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of the alkanolamine derivatives of the invention which comprises the interaction of a compound of the formula:

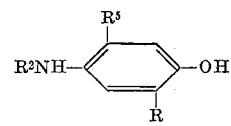

wherein $R^2$, $R^3$ and $R^5$ have the meanings stated above, with a compound of the formula:

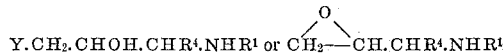

wherein $R^1$, $R^4$ and Y have the meanings stated above.

The last-named interaction may conveniently be carried out in the presence of an acid-binding agent, for example sodium hydroxide. Alternatively, an alkali metal derivative of the phenol reactant, for example the sodium or potassium derivative, may be used as starting material. The interaction may be carried out in a diluent or solvent, for example methanol or ethanol, and it may be accelerated or completed by the application of heat, for example by heating to the boiling point of the diluent or solvent.

According to a further feature of the invention we provide a process for the manufacture of the alkanolamine derivatives of the invention which comprises the interaction of an aminophenyl derivative of the formula:

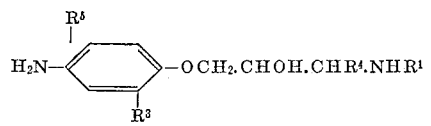

wherein $R^1$, $R^3$, $R^4$ and $R^5$ have the meanings stated above, with an acylating agent derived from an acid of the formula $R^2OH$, wherein $R^2$ has the meaning stated above, under such conditions that neither the amino nor the hydroxy radical of the alkanolamine side-chain are acylated.

A suitable acylating agent for use in the last-mentioned process is, for example, an acid halide, for example the acid chloride, or the acid anhydride, or a mixed acid anhydride, for example the mixed anhydride with monoethyl carbonic acid, or an activated ester, for example the p-nitrophenyl ester, derived from the acid of the formula $R^2OH$, wherein $R^2$ has the meaning stated above. Alternatively, the acid of the formula $R^2OH$ may itself be used as acylating agent, in the presence of a condensing agent, for example a carbodi-imide, for example $N,N^1$-dicyclohexyl-carbodi-imide.

The last-mentioned process may be carried out in a diluent or solvent, for example an aqueous diluent or solvent, for example water, an aqueous ketone, for example aqueous acetone, an aqueous alcohol, for example aqueous ethanol, or an aqueous acid, for example aqueous acetic acid; or a non-aqueous organic diluent or solvent, for example a ketone, for example acetone; an alcohol, for example ethanol; an ester, for example ethyl acetate; or an amide, for example dimethylformamide. The process is preferably carried out at a temperature within the range of 0 to 60° C., and most conveniently is carried out at ambient temperature. When aqueous conditions are used, the process is preferably carried out at a pH of between 3 and 5.

The aminophenyl derivative used as starting material in the last-mentioned process may be obtained by the reduction, for example by catalytic hydrogenation, of the corresponding nitrophenyl derivative.

According to a further feature of the invention we provide a process for the manufacture of those of the alkanolamine derivatives of the invention wherein $R^1$ does not stand for a hydrogenolysable aralkyl group which comprises the hydrogenolysis of a compound of the formula:

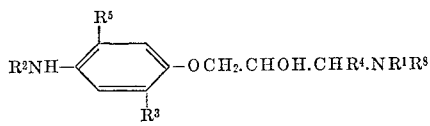

wherein $R^1$, $R^2$, $R^3$, $R^4$ and $R^5$ have the meanings stated above and wherein $R^8$ stands for a hydrogenolysable radical, or an acid-addition salt thereof.

As a suitable value for $R^8$ there may be mentioned, for example, the benzyl radical. The hydrogenolysis may be effected, for example, by catalytic hydrogenation, for example by hydrogenation in the presence of a palladium-on-charcoal catalyst, in an inert diluent or solvent, for example ethanol or aqueous ethanol. The process may be accelerated or completed by the presence of an acidic catalyst, for example hydrochloric or oxalic acid.

The starting material used in the last-mentioned process may be obtained by the acylation of the corresponding compound wherein $R^2$ stands for hydrogen with an acylating agent derived from the acid of the formula $R^2$—OH, wherein $R^2$ has the meaning stated above. A suitable acylating agent is, for example, an acyl halide or acid anhydride, or the acid itself in the presence of a condensing agent, for example a carbodiimide. Alternatively, the starting material may be obtained by the interaction of a compound of the formula:

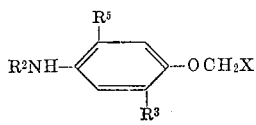

wherein $R^2$, $R^3$, $R^5$ and X have the meanings stated above, with an amine of the formula $NHR^1R^8$, wherein $R^1$ and $R^8$ have the meanings stated above, or by the interaction of a compound of the formula:

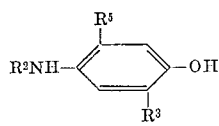

wherein $R^2$, $R^3$ and $R^5$ have the meanings stated above, with a compound of the formula:

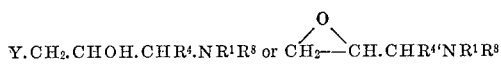

wherein $R^1$, $R^4$, $R^8$ and Y have the meanings stated above.

According to a further feature of the invention we provide a process for the manufacture of those of the alkanolamine derivatives of the invention wherein $R^1$ stands for a radical of the formula —$CHR^9R^{10}$, wherein $R^9$ stands for hydrogen or for an alkyl radical and $R^{10}$ stands for an alkyl radical which may optionally be substituted such that $R^1$ is optionally substituted as stated above, or wherein $R^9$ and $R^{10}$ are joined together with the adjacent carbon atom to form a cycloalkyl radical, which comprises the interaction of an amino derivative of the formula:

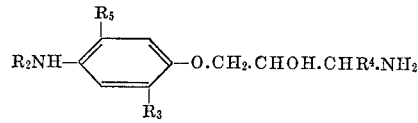

wherein $R^2$, $R^3$, $R^4$ and $R^5$ have the meanings stated above, or an acid-addition salt thereof, with a carbonyl compound of the formula $R^9.CO.R^{10}$, wherein $R^9$ and $R^{10}$ have the meanings stated above, under reducing conditions.

Suitable reducing conditions are those provided by the presence of hydrogen and a hydrogenation catalyst, for example platinum, in an inert diluent or solvent, for example water or ethanol, and/or, in the case wherein the said carbonyl compound used as starting material $R^9$ stands for an alkyl radical, in an excess of the carbonyl compound used as starting material; or by the presence of an alkali metal borohydride, for example sodium borohydride, in an inert diluent or solvent, for example in a solvent selected from water, ethanol, methanol and an excess of the carbonyl compound used as starting material.

It is to be understood that the said amino derivative may be generated in situ by, for example, reduction of the corresponding α-diazoketone, α-azidoketone, α-hydroxyiminoketone, α-nitroketone, α-nitro-alcohol, cyanhydrin or acyl cyanide. Alternatively, the amino derivative may be obtained by the interaction of the corresponding epoxide or halohydrin with ammonia.

According to a further feature of the invention we provide a process for the manufacture of the alkanolamine derivatives of the invention which comprises the interaction of an amino derivative of the formula:

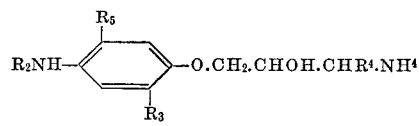

wherein $R^2$, $R^3$, $R^4$ and $R^5$ have the meanings stated above, or an acid-addition salt thereof, with a compound of the formula $R^1Z$ wherein $R^1Z$ stands for a reactive ester derived from an alcohol of the formula $R^1OH$, wherein $R^1$ has the meaning stated above.

As a suitable value for Z there may be mentioned, for example, the chlorine, bromine or iodine atom, the toluene-p-sulphonyloxy radical or a radical of the formula: —$OSO_2OR^1$, wherein $R^1$ has the meaning stated above. A particularly suitable compound of the formula $R^1Z$ is isopropyl bromide.

The interaction may conveniently be carried out in the presence of a base, for example an inorganic base, for example sodium or potassium carbonate, in the presence of a catalyst, for example potassium iodide, and in the presence of a diluent or solvent, for example ethanol or isopropanol. The interaction may conveniently be carried out at an elevated temperature, for example at a temperature of between 50 and 200° C., for example at about 70° C.

According to a further feature of the invention we provide a process for the manufacture of the alkanolamine derivatives of the invention which comprises the reduction of a compound of the formula:

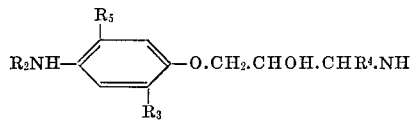

wherein $R^1$, $R^2$, $R^4$ and $R^5$ have the meanings stated above and wherein $R^{11}$ stands for an alkenyl radical.

$R^{11}$ may be, for example, an alkenyl radical of up to 10 carbon atoms, and particularly of 3 or 4 carbon atoms, for example the allyl radical. The reduction may be carried out, for example, by catalytic hydrogenation, for example by hydrogenation in the presence of a platinum oxide or palladium-on-charcoal catalyst, in a diluent or solvent, for example ethanol, and it may be carried out at ambient temperature and at atmospheric pressure.

According to a further feature of the invention we provide a process for the manufacture of the esters of the alkanolamine derivatives of the invention which comprises the interaction of an acid-addition salt of the corresponding unesterified alkanolamine derivative with an acylating agent.

As a suitable acylating agent there may be mentioned, for example, an acid halide or acid anhydride derived from an aliphatic carboxylic acid, for example such an acid of not more than 20 carbon atoms, or derived from an aromatic carboxylic acid, for example such an acid of not more than 10 carbon atoms. Thus a suitable acylating agent is, for example, acetic anhydride, acetyl chloride or benzoyl chloride. The acylation may be carried out in a diluent or solvent, which, in the case where an acid anhydride is used as acylating agent, may conveniently be the acid from which the anhydride is derived.

According to a further feature of the invention we provide a process for the manufacture of the oxazolidine derivatives of the alkanolamines of the invention which comprises the interaction of the corresponding alkanolamine derivative, or an acid-addition salt thereof, with an aldehyde of the formula $R^6.CHO$, wherein $R^6$ has the meaning stated above.

The said interaction may be carried out in a diluent or solvent, for example ethanol, optionally in the presence of a catalyst, for example hydrochloric acid, acetic acid or iodine, and it may be accelerated or completed by the application of heat. The water formed during the reaction may optionally be removed by azeotropic distillation using a suitable solvent, for example benzene, toluene or chloroform, as entraining agent, or it may optionally be removed by means of a dehydrating agent, for example anhydrous potassium carbonate.

The alkanolamine derivatives of the invention or the esters or aldehyde-condensation products thereof in free base form may be converted into the acid-addition salts thereof by reaction with an acid by conventional means.

As stated above, the alkanolamine derivatives of the present invention are of value in the treatment or prophylaxis of heart diseases. Furthermore, some of the alkanolamine derivatives of the invention possess selective β-adrenergic blocking activity. Compounds exhibiting this selective action show a greater degree of specificity in blocking the cardiac β-receptors than the β-receptors in peripheral blood vessels and bronchial muscle. Thus, a dose may be selected for such a compound at which the compound blocks the cardiac inotropic and chronotropic actions of a catecholamine [for example isoprenaline, that is, 1-(3,4-dihydroxyphenyl)-2-isopropylaminoethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways disesases, inasmuch as the selective compound will substantially inhibit the unwanted stimulatory effects of the bronchodilator on the heart but will not hinder the desirable therapeutic effect of the bronchodilator.

According to a further feature of the invention, therefore, we provide pharmaceutical compositions comprising as active ingredient one or more alkanolamine derivatives of the invention, or esters thereof, or aldehyde condensation products thereof, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solution or suspensions, dispersible powders, sprays and aerosol formulations.

The pharmaceutical compositions of the invention may contain, in addition to the alkanolamine derivative of the invention, one or more drugs selected from sedatives, for example phenobarbitone, meprobamate and chlorpromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myo-cardial depressants, for example quindine; agents used in the treatment of Parkinson's disease, for example benzhexol; and cardiotonic agents, for example digitalis preparations. Those of the pharmaceutical compositions of the invention which contain an alkanolamine derivative which possess selective β-adrenergic blocking properties as stated above may additionally contain a sympathomimetic bronchodilator, for example isoprenaline, orciprenaline, adrenaline or ephedrine.

It is expected that the preferred compounds would be given to man at an oral dose of between 20 mg. and 600 mg. daily, at doses spaced at 6–8 hourly intervals, or at an intravenous dose of between 1 mg. and 20 mg. daily. Preferred oral dosage forms are tablets or capsules containing between 10 mg. and 100 mg., and preferably 10 mg. or 40 mg. of active ingredient. Preferred intravenous dosage forms are sterile aqueous solutions of the alkanolamine derivatives or of non-toxic acid-addition salts thereof, containing between 0.05% and 1% w./v. of active ingredient, and more particularly containing 0.1% w./v. of active ingredient.

The invention is illustrated but not limited by the follownig examples in which the parts are by weight:

EXAMPLE 1

A mixture of 4.5 patrs of 1-(2-ethyl-4-propionamidophenoxy)-3-chloropropan-2-ol and 40 parts of t-butylamine is heated in a sealed vessel at 100° C. for 10 hours and the excess of t-butylamine is then removed from the mixture by evaporation under reduced pressure. The residue is shaken with a mixture of ethyl acetate and water, and the organic phase is separated and dried over magnesium sulphate. The dried solution is evaporated to dryness under reduced pressure and the solid residue is triturated with acetone. There is thus obtained 1-(2-ethyl-4-propionamidophenoxy) - 3-t-butylaminopropan-2-ol, M.P. 146° C.

The 1-(2-ethyl-4-propionamidophenoxy) - 3-chloropropan -2-ol used as starting material may be obtained as follows:

A mixture of 3 parts of 4-amino-2-ethylphenol, 30 parts of propionic anhydride and 30 parts of water is heated and stirred at 100° C. for 1 hour. The mixture is evaporated to dryness under reduced pressure and the solid residue is crystallised from ethyl acetate. There is thus obtained 2-ethyl-4-propionamidophenol, M.P. 152° C.

A mixture of 6 parts of 2-ethyl-4-propionamidophenol, 80 parts of epichlorohydrin and 1 part of piperidine is heated at 100° C. for 6 hours. The excess of epichlorohydrin is removed from the reaction mixture by evaporation under reduced pressure and there is thus obtained 1-(2-ethyl-4-propionamidophenoxy) - 3-chloropropan-2-ol as an oil.

EXAMPLE 2

The process described in Example 1 is repeated except that the appropriate amine and 1-aryloxy-3-chloropropan- 2-ol are used as starting materials. There are thus obtained the compounds described in the following table:

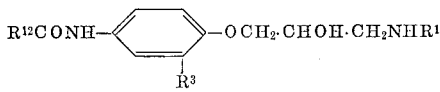

| R¹ | R¹² | R³ | M.P. (°C.) |
|---|---|---|---|
| Isopropyl | Ethyl | Ethyl | 136 |
| Do | p-Tolyl | Methyl | 165 |
| Do | Phenyl | do | 170 |
| t-Butyl | p-Tolyl | do | 130 |
| Isopropyl | Ethyl | do | 142 |
| t-Butyl | t-Butyl | do | [1] 230 |
| Isopropyl | do | Ethyl | [1] 222 |
| t-Butyl | do | do | [2] 230 |
| Isopropyl | p-Tolyl | do | 138 |
| t-Butyl | do | do | 216 |
| Isoproply | Phenyl | do | 134 |
| t-Butyl | do | do | [1] 194–198 |
| Isopropyl | Methyl | Methyl | 136–139 |
| Do | do | t-Butyl | [1] 228–232 |
| Do | do | Ethyl | 134–136 |

[1] Hydrocloride.
[1] Oxalate (with decomposition).

The 1-aryloxy-3-chloropropan-2-ol derivatives used as starting materials may be obtained by analogous means to those described in Example 1 for the preparation of 1-(2-ethyl-4-propionamidophenoxy)-3-chloropropan-2-ol.

EXAMPLE 3

The 1-aryloxy-3-chloropropan-2-ol derivatives used that the appropriate amine and 1-aryloxy-3-chloropropan-2-ol are used as starting materials. There are thus obtained the compounds described in the following table:

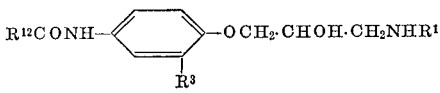

| R¹ | R¹² | R³ | M.P. (° C.) |
|---|---|---|---|
| Isopropyl | p-Chlorophenyl | Ethyl | 162 |
| t-Butyl | o-Chlorophenyl | do | [1] 210 |
| Isopropyl | o-Chlorophenyl | do | [1] 200 |
| t-Butyl | p-t-Butylphenyl | do | Oil |
| Isopropyl | do | do | Oil |
| t-Butyl | n-Propyl | do | 98 |
| Isopropyl | do | do | 132 |
| t-Butyl | Isoproply | do° | [1] 216 |
| Isopropyl | do | do | 140 |
| t-Butyl | n-Butyl | do° | 84 |
| Do | Prop-l-enyl | do | Oil |
| Do | Ethyl | do | 148 |
| Do | do | t-Butyl | Oil |
| Isopropyl | do | n-Butyl | 111–112 |
| Do | t-Butyl | Methyl | 88 |
| Do | Ethyl | s-Butyl | Oil |
| t-Butyl | do | do | Oil |
| Do | do | t-Pentyl | Oil |
| Do | do | 1-methylheptyl | Oil |
| Do | do | n-butyl | 90–92 |
| Do | p-Tolyl | isoproply | [2] 225–227 |
| Do | Ethyl | do | Oil |

[1] Hydrochloride.
[2] Hydrogen oxalate hemihydrate.

EXAMPLE 4

A mixture of 2.5 parts of 2,3-epoxy-1-(2-ethyl-4-propionamidophenoxy)propane and 20 parts of allylamine is heated under reflux for 3 hours and then evaporated to dryness under reduced pressure. The residue is shaken with 25 parts of aqueous N-hydrochloric acid and the mixture is extracted with 25 parts of ether. The aqueous phase is separated and basified with aqueous 11 N-sodium hydroxide solution and the mixture is extracted twice with 50 parts of ethyl acetate each time. The combined ethyl acetate extracts are dried over anhydrous magnesium sulphate and evaporated to dryness under reduced pressure. The residue is crystallised from ethyl acetate and there is thus obtained 3-allylamino-1-(2-ethyl-4-propionamidophenoxy)-2-propanol, M.P. 142–144° C.

The 2,3-epoxy-1-(2-ethyl-4-propionamidophenoxy)propane used as starting material may be obtained as follows:

18.7 parts of epichlorohydrin are added slowly to a stirred solution of 7.9 parts of 2-ethyl-4-propionamidophenol and 3.5 parts of sodium hydroxide in 50 parts of water, the temperature of the mixture being maintained between 10° and 15° C. The mixture is stirred at ambient temperature for 18 hours and then extracted twice with 75 parts of chloroform each time. The combined chloroform extracts are dried over anhydrous magnesium sulphate and evaporated to dryness under reduced pressure. The residue consists of 2,3-epoxy-1-(2-ethyl-4-propionamidophenoxy)propane.

The process described above is repeated except that the appropriate amine and 2,3-epoxy-1-aryloxypropane are used as starting materials, and there are thus obtained in similar manner the compounds described in the following table:

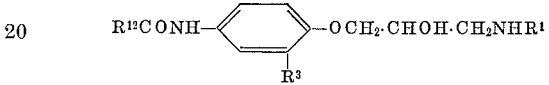

| R¹ | R¹² | R³ | M.P. (° C.) |
|---|---|---|---|
| Cyclopropyl | Ethyl | Ethyl | 132–138 |
| s-butyl | do | do | 104 |
| 2-hydroxy-1,1-dimethylethyl | do | do | 102–104 |
| 1,1-dimethyl-2-phenyethyl | do | Methyl | [1] 162–164 |

[1] Picrate (crystallized from aqueous ethanol).

The 2,3 - epoxy-1-(2-methyl-4-propionamidophenoxy) propane used as starting material may be obtained by a similar process to that described above for the manufacture of 2,3-epoxy-1-(2-ethyl - 4 - propionamidophenoxy) propane, except that 2-methyl-4-propionamidophenol is used as starting material in place of 2-ethyl-4-propionamidophenol.

EXAMPLE 5

A solution of 0.35 part of 1-(2-n-butyl-4-propionamidophenoxy)-3-(N-benzyl-N-t-butylamino)-2-propanol in 25 parts of ethanol is shaken with hydrogen in the presence of 0.1 part of a 5% palladium-on-charcoal catalyst until the uptake of hydrogen ceases. The mixture is filtered, the filtrate is evaporated to dryness and the residue is crystallised from a mixture of benzene and petroleum ether (B.P. 60–80° C.). There is thus obtained 1-(2-n-butyl-4-propionamidophenoxy)-3-t-butylamino-2-propanol, M.P. 90–92° C.

The 1-(2-n-butyl-4-propionamidophenoxy)-3 - N - benzyl-N-t-butylamino-2-propanol used as starting material may be prepared as follows:

A mixture of 98 parts of N-benzyl-t-butylamine and 63 parts of epichlorohydrin is heated at 95–100° C. for 4 hours and is then kept at ambient temperature for 17 hours. The mixture is shaken for 10 minutes with 100 parts of 20% aqueous sodium carbonate solution, 150 parts of 35% aqueous sodium hydroxide solution are added and the mixture is stirred and heated under reflux for 3 hours. The mixture is extracted with ether and the ethereal layer is dried over potassium carbonate and evaporated to dryness. The oily residue is distilled under reduced pressure and there is thus obtained 1,2-epoxy-3-(N-benzyl-N-t-butylamino)propane, B.P. 118–120° C./1.5 mm.

A solution of 0.2 part of 2-n-butyl-4-propionamidophenol, 0.2 part of 1,2-epoxy-3-(N-benzyl-N-t-butylamino)propane and 0.04 part of sodium hydroxide in 25 parts of ethanol is heated under reflux for 6 hours. The solution is poured into 250 parts of water and the mixture is extracted with ether. The ethereal extract is dried and evaporated to dryness and there is thus obtained as residue 1-(2-n-butyl-4-propionamidophenoxy)-3-(N-benzyl-N-t-butylamino)-2-propanol.

Many of the 4-acylamino-2-alkylphenols which are used as intermediates in the preparation of the alkanolamine derivatives described in Examples 2 to 5 are new compounds, and those phenols which are new and crystalline are characterised by the melting points shown in the following table:

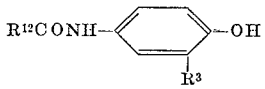

| R¹² | R³ | M.P. (° C.) |
|---|---|---|
| Phenyl | Methyl | 198 |
| p-tolyl | do | 221 |
| Ethyl | do | 162 |
| t-butyl | do | 156 |
| Do | Ethyl | 126 |
| p-tolyl | do | 190 |
| Phenyl | do | 166 |
| Methyl | t-butyl | 142–145 |
| Do | Ethyl | 139–144 |
| p-chlorophenyl | do | 182 |
| o-chlorophenyl | do | 164 |
| n-propyl | do | 88 |
| Isopropyl | do | 124 |
| n-Butyl | do | 90 |
| p-t-Butylphenyl | do | 140 |
| Prop-1-enyl | do | 122 |
| Ethyl | t-Butyl | 140 |
| Do | n-Butyl | 88–90 |
| Do | s-Butyl | 82–84 |
| p-Tolyl | Isopropyl | 145–148 |
| Ethyl | do | 102–108 |

Some of the 2-alkyl-4-aminophenols which are used as intermediates in the preparation of the 4-acylamino-2-alkylphenols described above are also new compounds and these compounds may be obtained by the following procedure, which exemplifies the preparation of 4-amino-2-t-butylphenol but is of general application for the manufacture of any 2-alkyl-4-aminophenol:

A solution of 6.5 parts of anhydrous sulphanilic acid and 1.77 parts of anhydrous sodium carbonate in 34 parts of water is cooled in ice and treated quickly with a solution of 2.48 parts of sodium nitrite in 6.6 parts of water. The resulting solution is then poured into a stirred mixture of 40 parts of ice and 8.25 parts of concentrated aqueous hydrochloric acid. The mixture thus obtained is added to a vigorously stirred solution of 5 parts of 2-t-butylphenol and 7.33 parts of sodium hydroxide in 40 parts of water and 31 parts of ice, the temperature of the mixture being maintained below 8° C. The resulting blood-red solution is stirred for 1 hour at 5–10° C. and is then heated to 45° C. 16 parts of sodium dithionite are added and the temperature of the mixture is raised to 70° C., whereupon the red colour is discharged (if the red colour does not disappear on heating, up to 2 parts of acetic acid are added dropwise until said colour does disappear). The solution is cooled and stirred whereupon the crude product is precipitated. The mixture is filtered and there is thus obtained 4-amino-2-t-butylphenol as the solid residue.

EXAMPLE 6

A solution of 0.7 part of 1-(2-allyl-4-propionamidophenoxy)-3-isopropylaminopropan-2-ol (prepared as described in Dutch patent specification No. 6,714,894) in 50 parts of ethanol is shaken with hydrogen in the presence of 0.25 part of a 5% palladium-on-charcoal catalyst until absorption of hydrogen ceases. The mixture is filtered and the filtrate is evaporated to dryness. The residue is crystallised from a mixture of ethyl acetate and petroleum ether (B.P. 60–80° C.) and there is thus obtained 1-(2-n-propyl-4-propionamidophenoxy) - 3 - isopropylaminopropan-2-ol, M.P. 134–135° C.

The process described above is repeated except that 1-(2-allyl - 4 - propionamidophenoxy)-3-t-butylaminopropan-2-ol is used as starting material (this compound is also described in the said Dutch specification). There is thus obtained 1-(2-n-propyl-4-propionamidophenoxy)-3-t-butylaminopropan-2-ol, M.P. 134–137° C.

The process described above is repeated except that 1-(2-allyl-4-n-heptanamidophenoxy)- and 1-(2-allyl-4-n-decanamidophenoxy)-3-isopropylaminopropan-2-ol are used as starting materials. There are thus obtained 1-(2-n-propyl-4-n-heptanamidophenoxy) - 3 - isopropylaminopropan-2-ol, M.P. 127–128° C. (crystallised from a mixture of ethyl acetate and petroleum ether, B.P. 60–80° C.) and 1-(2-n-propyl-4-n-decanamidophenoxy)-3-isopropylaminopropan-2-ol, M.P. 112–113° C. (crystallised from a mixture of ethyl acetate and petroleum ether, B.P. 60–80° C.).

The two last-mentioned starting materials may each be obtained by a similar process to that described in the said Dutch specification for the preparation of 1-(2-allyl-4 - propionamidophenoxy) - 3 - isopropylamino-2-propanol, except that 4-n-hexanamidophenol and 4-n-decanamidophenol are used respectively as starting materials The various intermediates obtained are characterised as follows:

4-allyloxy-n-hexananilide, M.P. 76–78° C.
4-allyloxy-n-decananilide, M.P. 82–84° C.
2-allyl-4-n-hexanamidophenol, M.P. 94–95° C.
2-allyl-4-n-decanamidophenol, M.P. 66–68° C.

EXAMPLE 7

A mixture of 0.9 part of 2-ethyl-4-propionamidophenol, 25 parts of ethanol, 0.4 part of sodium hydroxide, 2 parts of water and 0.67 part of 1-chloro-3-isopropylamino-2-propanol hydrochloride is heated under reflux for 3 hours. The mixture is filtered and the filtrate is evaporated to dryness under reduced pressure. The residue is stirred with 25 parts of ether and 25 parts of water, the mixture is filtered and the solid residue is crystallised from ethyl acetate. There is thus obtained 1-(2-ethyl-4-propionamidophenoxy)-3-isopropylamino-2-propanol, M.P. 136–137° C.

EXAMPLE 8

A solution of 2.21 parts of N,N'-dicyclohexylcarbodiimide in 20 parts of ethyl acetate is added rapidly to a stirred solution of 2.0 parts of 1-(4-amino-2-n-propylphenoxy)-3-t-butylamino-2-propanol and 3.15 parts of butyric acid in 30 parts of ethyl acetate which is cooled in an ice-bath. The course of the reaction is followed by placing small portions of the reaction mixture onto filter-paper which has been sprayed with a 4% solution of ceric ammonium nitrate in 10% aqueous sulphuric acid, the presence of the 4-aminophenoxy derivative being shown by the development of a purple coloration. When the reaction is complete, 60 parts of aqueous 2 N-hydrochloric acid are added and the mixture is stirred vigorously and then filtered. The aqueous layer is separated, basified and extracted twice with 50 parts of ethyl acetate each time. The ethyl acetate extract is washed with water, dried and evaporated to dryness and the residue is crystallised from a mixture of ethyl acetate and hexane. There is thus obtained 1-(4-butyramido-2-n-propylphenoxy)-3-t-butylamino-2-propanol, M.P. 116.5–118° C.

The process described above is repeated except that the butyric acid is replaced by an equivalent amount of the appropriate carboxylic acid and there are thus obtained:

1-(4-chloroacetamido-2-n-propylphenoxy) - 3 - t - butylamino-2-propanol, M.P. 130–132° C. (crystallised from a mixture of ethyl acetate and hexane); and 1 - (4-cyclopropanecarbonamido-2-n-propylphenoxy)-3-t-butylamino-2-propanol, M.P. 155–158° C. (crystallised from ethyl acetate).

The 1-(4-amino-2-n-propylphenoxy)-3-t-butylamino-2-propanol used as starting material may be obtained as follows:

A mixture of 26.4 parts of 2-allyl-4-nitrophenol, 150 parts of epichlorohydrin and 0.1 part of piperidine is heated at 95–100° C. for 21 hours and the excess of epichlorohydrin is removed by evaporation under reduced pressure. A solution of 10 parts of potassium hydroxide in 150 parts of ethanol is added, the mixture is stirred for 5 minutes and most of the ethanol is then removed by evaporation. 150 parts of water are added to the residue and the mixture is extracted twice with 150 parts of ether each time. The ethereal extract is washed with 60 parts of water, dried, treated with charcoal and filtered and the filtrate is evaporated to dryness. The residual oil consists of 1-(2-allyl-4-nitrophenoxy)-2,3-epoxypropane.

A mixture of 35 parts of the above epoxy compound, 50 parts of t-butylamine and 100 parts of ethanol is stirred at ambient temperature for 3 days and is then evaporated to dryness. The residue is shaken with 200 parts of ether and 300 parts of aqueous 2N-hydrochloric acid and the aqueous layer is separated, basified and extracted successively with 300 and 150 parts of ether. The combined ethereal extracts are washed with water, dried and evaporated to dryness and there is thus obtained as residue 1-(2-allyl- 4-nitrophenoxy)-3-t-butylamino-2-propanol.

*a* solution of 15 parts of the above compound in 200 parts of ethanol is shaken with hydrogen in the presence of 0.8 part of platinum oxide at atmospheric pressure and ambient temperature for 2 hours. The mixture is filtered and the filtrate is evaporated to dryness. The residue consists of 1-(4-amino-2-n-propylphenoxy)-3-t-butylamino-2-propanol.

EXAMPLE 9

The process described in Example 8 is repeated except that equivalent amounts of 1-(4-amino-2-ethylphenoxy)-3-t-butylamino-2-propanol and acrylic acid are used as starting materials in place of 1-(4-amino-2-n-propylphenoxy)-3-t-butylamino-2-propanol and butyric acid respectively. There is thus obtained 1-(4-acryloylamino-2-ethylphenoxy)-3-t-butylamino-2-propanol, which crystallises from a mixture of chloroform and cyclohexane with three-quarters of a mole of water of crystallisation per mole of base, M.P. 137–140° C.

The 1-(4-amino-2-ethylphenoxy)-3-t-butylamino-2-propanol used as starting material may be obtained as follows:

A solution of 5 parts of 1-(2-ethyl-4-nitrophenoxy)-3-t-butylamino-2-propanol (M.P. 74–76° C.; prepared from 2-ethyl-4-nitrophenol, epichlorohydrin and t-butylamine by a similar process to that described in the first and third parts of Example 1) in 150 parts of ethanol is shaken with hydrogen in the presence of 2.5 parts of a 5% palladium-on-charcoal catalyst at atmospheric pressure and ambient temperature for 40 minutes. The mixture is filtered and the filtrate is evaporated to dryness. The residue consists of 1-(4-amino-2-ethylphenoxy-3-t-butylamino-2-propanol.

EXAMPLE 10

The process described in Example 9 is repeated except that an equivalent amount of cinnamic acid is used in place of the acrylic acid, and also that after the reaction is complete the basified aqueous layer is not extracted with ethyl acetate but is evaporated to dryness under reduced pressure. The residue is extracted with ether and then with benzene and the combined organic extracts are filtered. The filtrate is evaporated to dryness and the residue is chromatographed on a silica gel column, using successively chloroform, increasing concentrations of methanol in chloroform, methanol and increasing concentrations of triethylamine in methanol as eluting solvents. The material eluted by solvents in the range from 30% methanol in chloroform to 10% triethylamine in methanol is retained and is further purified by preparative thin-layer chromatography on silica gel plates, using a mixture of ethyl acetate/ethanol/triethylamine in the proportions 100:20:3 by volume as developing solvent. The material with an $R_f$ value of 0.3 is collected and crystallised from a mixture of ethyl acetate and hexane, and there is thus obtained 1-(4-cinnamamido-2-ethylphenoxy) - 3 - t-butylamino-2-propanol, M.P. 137.5–140° C.

EXAMPLE 11

Potassium bicarbonate is added to a solution of 1 part of 1 - (4-amino-2-n-propylphenoxy)-3-t-butylamino - 2-propanol and 0.8 part of ethanesulphonyl chloride in 20 parts of 0.25 molar aqueous acetic acid until the pH of the mixture is 5. 1 part of sodium acetate is added, the mixture is heated to 55° C., and a further 0.4 part of ethanesulphonyl chloride is added. The mixture is heated under reflux for 4 hours and is then kept at ambient temperature for 17 hours. The pH of the mixture is readjusted to 5, a further 0.8 part of ethanesulphonyl chloride is added and the mixture is heated under reflux for 2 hours and then cooled, basified and extracted twice with 25 parts of ethyl acetate each time. The combined extracts are extracted successively with 50 and 25 parts of aqueous 2 N-hydrochloric acid and the combined acidic extracts are basified and extracted twice with 50 parts of ethyl acetate each time. The combined extracts are dried, treated with charcoal and filtered and the filtrate is evaporated to dryness. The residue is crystallised from ethyl acetate and there is thus obtained 1-(4-ethanesulphonamido-2-n-propylphenoxy)-3-t-butylamino - 2 - propanol, M.P. 153–156° C.

EXAMPLE 12

The process described in Example 1 is repeated except that 1-(2,5-dimehtyl-4-propionamidophenoxy)-3-chloro-2-propanol is used as starting material in place of the 1-(2-ethyl-4-propionamidophenoxy) - 3 - chloro - 2 - propanol. There is thus obtained 1-(2,5-dimethyl-4-propionamidophenoxy)-3-t-butylamino-2-propanol, M.P. 139–141° C. (crystallised from ethyl acetate).

The 1-(2,5-dimethyl-4-propionamidophenoxy)-3-chloro-2-propanol used as starting material may be obtained as follows:

A solution of 10 parts of 2,5-dimethyl-4-nitrophenol in 150 parts of ethanol is shaken with hydrogen in the presence of 5 parts of a 5% palladium-on-charcoal catalyst at atmospheric pressure and ambient temperature for 45 minutes. The mixture is filtered and the filtrate is discarded; the catalyst is stirred with 200 parts of aqueous 2 N-hydrochloric acid and the mixture is filtered. Solid potassium bicarbonate is added to the filtrate until the pH of the solution is 4, 50 parts of propionic anhydride are added and the mixture is stirred and heated at 70° C. for 1 hour and is then evaporated at 70° C. until only half the original volume remains. The solutions is cooled and filtered and the solid product is washed with ether and dried. There is thus obtained 2,5-dimethyl-4-propionamidophenol, M.P. 202–206° C.

The above phenol is reacted with epichlorohydrin and piperidine by a similar process to that described in the third part of Example 1 and there is thus obtained 1-(2,5-dimethyl-4-propionamidophenoxy) - 3-chloro-2-propanol, M.P. 146–150° C.

EXAMPLE 13

A mixture of 2.09 parts of 1-(2-ethyl-4-propionamidophenoxy)-2,3-epoxybutane, 4 parts of t-butylamine and 6 parts of methanol is heated in a sealed tube at 110° C. for 12 hours, and then evaporated to dryness under reduced pressure. The residue is dissolved in 50 parts of ethyl acetate and the solution is extracted twice with 50 parts of aqueous 2 N-hydrochloric acid each time. The combined aqueous acidic layers are basified and extracted twice with 50 parts of ethyl acetate each time. The combined organic extract is dried and evaporated to dryness and the basic residue is converted into a hydrochloride by conventional means. The hydrochloride is crystallized from a mixture of methanol and ethyl acetate and there is thus obtained 1-(2-ethyl-4-propionamidophenoxy)-3-t-butylamino-2-butanol, M.P. 211–213° C.

The 1 - (2-ethyl-4-propionamidophenoxy) - 2,3-epoxybutane used as starting material may be obtained as follows:

A mixture of 1.93 parts of 2-ethyl-4-propionamidophenol, 1.6 parts of 1,2-epoxy-3-chlorobutane, 50 parts of ethanol and 0.44 part of sodium hydroxide is heated under reflux for 2 hours and then filtered. The filtrate is evaporated to dryness and the residue is shaken with 50 parts of water and 100 parts of ethyl acetate. The organic layer is dried and evaporated to dryness and there is thus obtained as residue 1-(2-ethyl-4-propionamidophenoxy)-2,3-epoxybutane.

EXAMPLE 14

0.5 part of acetic anhydride is added to a mixture of 0.5 part of 1-(4-amino-2-n-propylphenoxy)-3-isopropylamino-2-propanol, 0.15 part of acetic acid and 10 parts of water and the mixture is shaken at ambient temperature for 30 minutes. The solution is filtered and sufficient aqueous 2 N-sodium hydroxide solution is added to the filtrate to raise the pH of the solution to 9.0–12.0. The mixture is extracted with 20 parts of ethyl acetate and the extract is washed with water, dried and evaporated to dryness. The residue is crystallised from ethanol and there is thus obtained 1-(4-acetamido-2-n-propylphenoxy)-3-isopropylamino-2-propanol, M.P. 137–138° C.

The 1 - (4-amino-2-n-propylphenoxy) - 3-isopropylamino-2-propanol (M.P. 93–95° C.) used as starting material may be obtained by a similar process to that described in Example 8 for the preparation of 1-(4-amino-2-n-propylphenoxy) - 3 - t-butylamino-2-propanol, except that isopropylamine is used in place of t-butylamine.

EXAMPLE 15

0.6 part of 1-(2-ethyl-4-propionamidophenoxy)-2,3-epoxypropane is added to a solution of 5 parts of ammonia in 20 parts of methanol which contains 0.02 part of triethylamine, and the mixture is kept at ambient temperature for 12 hours and is then evaporated to dryness. The residue is triturated with 3 parts of ether, the mixture is filtered and the residue is crystallised from ethanol. There is thus obtained 1-(2-ethyl-4-propionamidophenoxy)-3-amino-2-propanol, M.P. 151° C.

EXAMPLE 16

A mixture of 1 part of 1-(2-ethyl-4-propionamidophenoxy)-3-amino-2-propanol, 20 parts of water, 10 parts of acetone and 0.3 part of platinum oxide is stirred in an atmosphere of hydrogen at a pressure of 2.5 atmospheres for 12 hours. The mixture is filtered and the filtrate is evaporated under reduced pressure until only half of the original volume remains. 5 parts of sodium chloride are added and the mixture is extracted with 50 parts of ethyl acetate. The ethyl acetate extract is evaporated to dryness and the residue is triturated with 10 parts of ether. The mixture is filtered and the residue is crystallised from ethyl acetate. There is thus obtained 1-(2-ethyl-4-propionamidophenoxy) - 3-isopropylamino-2-propanol, M.P. 136° C.

EXAMPLE 17

0.3 part of sodium borohydride is added during ten minutes to a stirred mixture of 1 part of 1-(2-ethyl-4-propionamidophenoxy)-3-amino-2-propanol, 20 parts of acetone and 20 parts of water. The mixture is evaporated under reduced pressure until only half of the original volume remains. The product is isolated by the procedure described in Example 16 and there is thus obtained 1-(2-ethyl-4-propionamidophenoxy)-3-isopropylamino-2 - propanol, M.P. 136° C.

EXAMPLE 18

A mixture of 0.5 part of 1-(2-ethyl-4-propionamidophenoxy)-3-amino-2-propanol, 1.5 parts of isopropyl bromide, 20 parts of isopropanol, 1 part of potassium carbonate and 0.1 part of potassium iodide is stirred at 70° C. for 12 hours. The mixture is filtered and the filtrate is evaporated to dryness under reduced pressure. 5 parts of water are added and the mixture is extracted with 50 parts of ethyl acetate. The ethyl acetate extract is evaporated to dryness and to the residue are added 50 parts of ether. The mixture is stirred for 1 hour and filtered. The filtrate is evaporated to dryness and the residue is crystallised from ethyl acetate. There is obtained 1-(2-ethyl-4-propionamidophenoxy)-3-isopropylamino-2 - propanol, M.P. 136° C.

EXAMPLE 19

A mixture of 0.5 part of 1-(2-n-butyl-4-propionamidophenoxy)-3-isopropylamino-2-propanol, 50 parts of ethanol and 4 parts of 36% w./v. aqueous formalin solution is heated under reflux for 6 hours and is then evaporated to dryness under reduced pressure. The residue is dissolved in 5 parts of ethanol and a saturated solution of picric acid in ethanol is added until the pH of the mixture is 1. The mixture is filtered and the solid residue is crystallised from ethanol. There is thus obtained 5-(2-n-butyl - 4 - propionionanidophenoxymethyl)-3-isoproploxazolidine picrate, M.P. 178–179° C.

EXAMPLE 20

A mixture of 2.94 parts of 3-isopropylamino-1-(2-methyl-4-propionamidophenoxy)-2-propanol, 10 parts of acetic acid and 2 parts of acetic anhydride is kept at ambient temperature for 18 hours and is then poured into a mixture of 50 parts of ice and 25 parts of aqueous ammonium hydroxide solution (specific gravity 0.88). The mixture is extracted twice with 50 parts of ether each time and the combined ethereal extracts are dried over anhydrous magnesium sulphate and then added to a solution of 1.26 parts of oxalic acid in 25 parts of ethyl acetate. The mixture is filtered and the solid residue is crystallised from ethanol. There is thus obtained 1-isopropylaminomethyl-2-(2-methyl - 4 - propionamidophenoxy) ethyl hydrogen oxalate, M.P. 124° C.

The $\beta$-adrenergic blocking effect of a selection of the alkanolamine derivatives of the invention was measured in terms of the inhibition of isoprenaline-induced tachycardia in cats by the following procedure, which is standard in the art for the measuerment of such activity and which is based on the procedure described by Black and Stephenson in The Lancet, August 1962, p. 311.

A cat was anaetsthetised with chloralose, at a dose of 80 mg./kg. bodyweight given intravenously, and its heart rate and blood pressure were continuously recorded. Isoprenaline [1-(3,4-dihydroxyphenyl) - 2 - isopropylaminoethanol] was then administered intravenously to the cat at intervals of 10 minutes, at a dose of 0.20 $\mu$g./kg. bodyweight each time. Each injection of isoprenaline caused a transient increase in heart rate (a tachycardia) and a transient fall in blood pressure, and the mean of three increases in heart rate, measured in beats per minute, was termed the control tachycardia. The compound under test was then administered to the cat by continuous intravenous infusion at a given rate (usually in the range between 1 and 10 $\mu$g./kg. bodyweight/minute) for a period of 30 minutes, the heart rate and blood pressure of the cat still being continuously recorded (it being understood that administration of the compound might in itself have some effect on the heart rate and/or blood pressure of the cat). Isoprenaline was again administered intravenously at intervals of 10 minutes at a dose of 0.20 $\mu$g./kg. bodyweight each time, and the tachycardia caused by the administration of isoprenaline 30 minutes after the beginning of infusion of the test compound was measured (the increase in heart rate being calculated using the heart rate immediately before administration of isoprenaline, and not necessarily that at the beginning of the experiment, as the base-line). The difference between this tachycardia and the control tachycardia was then expressed as a percentage of the control tachycardia, this percentage being termed the "percentage inhibition of the control tachycardia."

The rate of infusion of test compound was then increased, in geometric progression, such that test compound was administered for successive periods of 30 minutes at each rate, and isoprenaline-induced tachycardia was measured as described above, until a dose was reached which caused a 75% inhibition of the control tachycardia.

The percentage inhibition of control tachycardia was then plotted graphically against the logarithm of the total amount of test compound infused during the 30 minutes immediately preceding the measurement of each tachycardia, and that dose which, when infused during 30 minutes produced a 50% inhibition of the control tachycardia, was determined from the graph. This dose, which is designated the $ED_{50}$ and is recorded in μg./kg. bodyweight, is taken as a measure of the β-adrenergic blocking activity of the test compound.

The results obtained with certain alkanolamine derivatives of the invention are as follows:

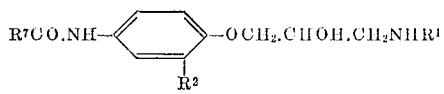

| R¹ | R³ | R⁷ | $ED_{50}$ μg./kg.) |
|---|---|---|---|
| Isopropyl | Methyl | Ethyl | 171 |
| t-Butyl | do | do | 27 |
| Isopropyl | do | Methyl | 249 |
| Do | do | t-Butyl | 222 |
| t-Butyl | do | do | 255 |
| Isopropyl | do | Phenyl | 90 |
| Do | do | p-Tolyl | 66 |
| t-Butyl | do | do | 57 |
| Isopropyl | Ethyl | Methyl | 111 |
| Do | do | Ethyl | 108 |
| t-Butyl | do | do | 24 |
| H | do | do | 141 |
| s-Butyl | do | do | 150 |
| Cyclopentyl | do | do | 150 |
| 2Hydroxy-1,1-dimethylethyl | do | do | 90 |
| Isopropyl | do | n-Propyl | 36 |
| t-Butyl | do | do | 22 |
| Isopropyl | do | Isopropyl | 168 |
| t-Butyl | do | do | 81 |
| Do | do | n-Butyl | 12 |
| Isopropyl | do | t-Butyl | 156 |
| t-Butyl | do | do | 69 |
| Isopropyl | do | Phenyl | 48 |
| t-Butyl | do | do | 28 |
| Isopropyl | do | p-Tolyl | 36 |
| t-Butyl | do | do | 54 |
| Isopropyl | do | o-Chlorophenyl | 180 |
| t-Butyl | do | do | 114 |
| Isopropyl | do | p-Chlorophenyl | 45 |
| t-Butyl | do | p-t-Butylphenyl | 300 |
| Do | do | Vinyl | 102 |
| Do | do | Prop-1-enyl | 33 |
| Do | do | Styryl | 30 |
| Isopropyl | n-Propyl | Methyl | 42 |
| Do | do | Ethyl | 72 |
| t-Butyl | do | do | 15 |
| Do | do | n-Propyl | 42 |
| Isopropyl | do | n-Hexyl | 56 |
| Do | do | n-Nonyl | 420 |
| t-Butyl | do | Chloromethyl | 57 |
| Do | do | Cyclopropyl | 30 |
| Do | Isopropyl | Ethyl | 10 |
| Do | do | p-Tolyl | 87 |
| Isopropyl | n-Butyl | Ethyl | 72 |
| t-Butyl | do | do | 22 |
| Isopropyl | s-Butyl | do | 300 |
| t-Butyl | do | do | 75 |
| Isopropyl | t-Butyl | Methyl | 183 |
| t-Butyl | do | Ethyl | 63 |
| Do | t-Pentyl | do | 60 |

It is clear from the abovementioned results that the alkanolamine derivatives of the invention possess β-adrenergic blocking activity in warm-blooded animals. It is recommended that, in the treatment of warm-blooded animals, the alkanolamine derivatives of the invention be administered orally at a dose of between 0.25 and 10 mg. per kg. bodyweight daily, or at an intravenous dose of between 0.01 and 0.25 mg. per kg. bodyweight daily. In particular, when used in the treatment of man, it is recommended that a total daily oral dose of between 20 mg. and 600 mg., or a total daily intravenous dose of between 1 mg. and 20 mg., is used.

What we claim is:

1. An alkanolamine derivative selected from compounds of the formula:

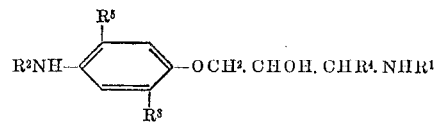

wherein R¹ is hydrogen, or unsubstituted alkyl of up to 5 carbon atoms, or alkyl of up to 5 carbon atoms which is substituted by one hydroxy or one phenyl, or wherein R¹ is cycloalkyl of 3 to 5 carbon atoms or allyl; wherein R² is alkanoyl of up to 10 carbon atoms, or chloroacetyl, or benzoyl which is unsubstituted or which is substituted by one halogen or by one alkyl of up to 4 carbon atoms, or alkenyoyl of up to 6 carbon atoms which is unsubstituted or which is substituted by phenyl, or alkanesulphonyl or cycloalkanecarbonyl each of up to 6 carbon atoms; wherein R³ is alkyl of up tot 8 carbon atoms; and wherein R⁴ and R⁵, which may be the same or different, are hydrogen or methyl; and the non-toxic, pharmaceutically-acceptable acid-addition salts thereof.

2. An alkanolamine derivative selected from a compound of the formula given in claim 10 wherein R¹ stands for hydrogen or for the isopropyl, s-butyl, t-butyl, 2-hydroxy-1,1-dimethylethyl, 1,1-dimethyl-2-phenylethyl, cyclopropyl, cyclobutyl, cyclopentyl, or allyl radical, wherein R² stands for the formyl, acetyl, propionyl, n-butyryl, isobutyryl, valeryl, pivaloyl, hexanoyl, decanoyl, chloroacetyl, cyclopropanecarbonyl, cyclohexanecarbonyl, acryloyl, crotonyl, benzoyl, p-methylbenzoyl, p-t-butylbenzoyl, o-chlorobenzoyl, p-chlorobenzoyl, cinnamoyl, methanesulphonyl or ethanesulphonyl radical; wherein R³ stands for the methyl, ethyl, n-propyl, isopropyl, n-butyl, s-butyl, t-butyl, t-phenyl or 1-methylheptyl radical; and wherein R⁴ and R⁵, which may be the same or different, stand for hydrogen or for methyl radicals; and the hydrochloride, hydrobromide, phosphate, sulphate, oxalate, lactate, tartrate, acetate, salicylate, citrate, benzoate, β-naphthoate, adipate or 1,1 - methylene-bis-(2-hydroxy-3-naphthoate) thereof.

3. An alkanolamine derivative selected from compounds of the formula:

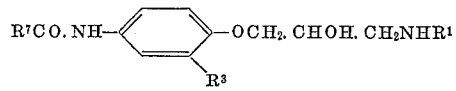

wherein R¹ stands for the isopropyl or t-butyl radical, wherein R³ stands for an alkyl radical of up to 4 carbon atoms, and wherein R⁷ stands for an alkyl radical of up to 4 carbon atoms, an alkenyl radical of 2 or 3 carbon atoms, the cyclopropyl, phenyl or cinnamoyl radical, or a tolyl or monochlorophenyl radical, and the non-toxic, pharmaceutically acceptable acid-addition salts thereof.

4. An alkanolamine according to claim 3 wherein R¹ is isopropyl or t-butyl, R³ is methyl, ethyl, n-propyl, n-butyl or s-butyl and R⁷ is ethyl, and the non-toxic, pharmaceutically-acceptable acid-addition salts thereof.

References Cited

UNITED STATES PATENTS 3,408,387   10/1968   Howe et al. _____ 260—558

HENRY R. JILES, Primary Examiner

H. I. MOATZ, Assistant Examiner

U.S. Cl. X.R.

260—307 R, 348 R, 501.1, 556 A, 557 R, 558 D, 558 P, 559 B, 562 B, 570.7, 574, 575; 424—324